United States Patent
Husemann et al.

(10) Patent No.: US 7,248,694 B2
(45) Date of Patent: Jul. 24, 2007

(54) ACCESS TO ENCRYPTED BROADCAST CONTENT

(75) Inventors: Dirk Husemann, Adliswil (CH); Michael Nidd, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 10/497,816

(22) PCT Filed: Dec. 10, 2002

(86) PCT No.: PCT/IB02/05230

§ 371 (c)(1),
(2), (4) Date: Dec. 13, 2004

(87) PCT Pub. No.: WO03/051056

PCT Pub. Date: Jun. 19, 2003

(65) Prior Publication Data

US 2005/0100161 A1    May 12, 2005

(30) Foreign Application Priority Data

Dec. 10, 2001 (EP) .................................. 01129413

(51) Int. Cl.
*H04N 7/167* (2006.01)
(52) U.S. Cl. .................. 380/200; 380/25; 380/231; 713/163; 713/165; 705/78
(58) Field of Classification Search ................ 380/200, 380/25, 231; 713/163, 165; 705/78
See application file for complete search history.

(56) References Cited

U.S. PATENT DOCUMENTS

| 5,598,470 A | * | 1/1997 | Cooper et al. .............. 713/165 |
| 5,825,884 A | * | 10/1998 | Zdepski et al. ............... 705/78 |
| 6,073,235 A | * | 6/2000 | Foladare et al. ............ 713/163 |
| 6,470,085 B1 | * | 10/2002 | Uranaka et al. ............ 380/231 |

FOREIGN PATENT DOCUMENTS

| JP | 2000-138664 | 5/2000 |
| JP | 2001-111543 | 4/2001 |
| JP | 2001-313633 | 11/2001 |

* cited by examiner

*Primary Examiner*—Taghi T. Arani
(74) *Attorney, Agent, or Firm*—Scully, Scott, Murphy & Presser, P.C.; Lisa M. Yamonaco (57) ABSTRACT

Methods for providing a receiver subsystem with access via a clearing house subsystem to a content item broadcast from a content provider subsystem. A method includes generating the request for access in the receiver subsystem, and employs a content key, a blocking nonce, a public key of a public-private key pair, a public key encrypted content key, and a double encrypted content key. The method may also include, in the receiver subsystem, encrypting the request for access based on the private key of the public-private key pair. Provides apparatus for providing access to a broadcast content item. A receiver subsystem is arranged to generate the request for access. In an example embodiment the receiver subsystem is arranged to encrypt the request for access based on the private key of the public-private key pair. Provides a receiver subsystem, a content provider subsystem, and a clearing house subsystem.

21 Claims, 7 Drawing Sheets

ACCESS TO ENCRYPTED BROADCAST CONTENT

CROSS REFERENCE AND PRIORITY

This application filed under 35 USC 371, is cross-referenced with, and claims priority from, International Patent Application PCT/IB2002/05230 filed on Dec. 10, 2002, and published in English with Publication No. WO2003/051056 on Jun. 19, 2003, under PCT article 21(2), which in turn claims priorty of EP 01129413.9, filed on Dec. 10, 2002.

The present invention relates to methods and apparatus for providing access to content items in broadcast networks.

Examples of broadcast networks to which the present invention is applicable include the Eureka-147 Digital Audio Broadcast (DAB) system, XM Radio's SDARS and the like. Commercial use of digital radio systems such as DAB requires a subsystem for broadcast content and services in a protected manner to allow access to such broadcast content and services only to subscribing users. Such systems are generally referred to as conditional access systems. Examples of conventional conditional access systems include Internet applications and Cable TV networks. In such systems, the content is typically encrypted or "scrambled" before transmission over the network for detection by a receiver in the possession of the subscriber. The subscriber is supplied with a key for configuring the receiver to unscramble the content received.

There are a range of conventional methods for obtaining a content key. For example, in some conventional systems, the subscriber acquires the key by first establishing a connection to the content provider via the Internet and then, usually in response to some form of payment transaction, downloading the key. In other conventional systems, the content provider may send a key to the receiver via the Internet or cable TV network. Similarly, the content provider may, in some cases, remotely configure the receiver to enable and disable reception of specific items of contents. Where communications via the Internet are employed, key distribution is relatively simple because the Internet provides for bi-directional one to one connections via TCP, for example. Additionally, the Internet permits tree based network topologies that shield the remainder of the network from bandwidth demands of key distribution. Similarly, many conventional cable TV networks provide a back channel for interacting with the receiver. In general, cable TV networks are also hierarchically structured, with the location each receiver being generally fixed and known to the network operator. Key distribution can thus be performed directly to those parts of the network tree hosting specific receivers.

Key distribution is more difficult in broadcast networks such as digital radio networks because such networks typically provide only a one way communications channel. Specifically, such networks do not typically accommodate a back channel. Additionally, such networks do not usually have a hierarchical structure. It is difficult to supply content keys over the content distribution network itself, especially where the network serves a relatively large number of receivers, because the bandwidth needed to accommodate even relatively small personalized keys to the receivers would exceed the bandwidth available for distributing the content itself. In addition, it would be practical for the subscribers to acquire the necessary content keys in advance. The combination of content key distribution in advance and absence of back channel availability is problematical. It would be desirable to supply the content keys in advance because they cannot be supplied individually on demand. However, it would be equally desirable to prevent a subscriber from distributing keys that are legitimately acquired to unauthorized peers. It would also be desirable to provide conditional access via a content provider independently of third parties. In addition, it would be desirable for receivers of such a service to support both system with and without a back channel.

In accordance with thre present invention, there is now provided a method for providing a receiver subsystem with access via a clearing house subsystem to a content item broadcast from a content provider subsystem, the method comprising: in the content provider subsystem, encrypting the content item based on a content key to produce an encrypted content item, generating a blocking nonce corresponding to the content key, transmitting the content key and the blocking nonce to the clearing house subsystem, and transmitting the encrypted content item and the blocking nonce to the receiver subsystem; in the clearing house subsystem, receiving the content key and the blocking nonce from the content provider subsystem, receiving a public key of a public-private key pair of the receiver subsystem, and, in response to a request for access to the content item, encrypting the content key based on the public key to produce a public key encrypted content key, encrypting the public key encrypted content key based on the blocking nonce to produce a double encrypted content key, and transmitting the double encrypted content key to the receiver subsystem; and, in the receiver subsystem, receiving the double encrypted content key from the clearing house subsystem, receiving the encrypted content item and the blocking nonce from the content provider subsystem, decrypting the double encrypted content key based on the blocking nonce to recover the public key encrypted content key, decrypting the public key encrypted content key based on a private key of the public-private key pair to recover the content key, and decrypting the encrypted content item based on the content key to recover the requested content item.

Preferably, the method includes generating the request for access in the receiver subsystem. The method may also include, in the receiver subsystem, encrypting the request for access based on the private key of the public-private key pair.

Viewing the present from another aspect, there is now provided apparatus for providing access to a broadcast content item, the apparatus comprising: a receiver subsystem having a public private key pair; a content provider subsystem having an first encryption unit for encrypting the content item based on a content key to produce an encrypted content item, a nonce generator for generating a blocking nonce corresponding to the content key, and a first transmitter connected to the encryption unit and nonce generator for transmitting the content key, the blocking nonce, and the encrypted content item; and, a clearing house subsystem having a first receiver for receiving the content key and the blocking nonce from the content provider subsystem and the public key of the receiver subsystem, a second encryption unit connected to the first receiver for encrypting the content key based on the public key to produce a public key encrypted content key and encrypting the public key encrypted content key based on the blocking nonce to produce a double encrypted content key in response to a request for access to the content item, and a second transmitter connected to the second encryption unit for transmitting the double encrypted content key to the receiver subsystem; wherein, the receiver subsystem further comprises a second receiver for receiving the double encrypted content key from the clearing house subsystem and the encrypted content item and the blocking nonce from the content provider subsystem, and a decryption unit connected to the receiver for decrypting the double encrypted content key based on the blocking nonce to recover the public key encrypted content key, decrypting the public key encrypted content key based on a private key of the public private key pair to recover the content key, and decrypting the encrypted content item based on the content key to recover the requested content item.

The receiver subsystem is preferably arranged to generate the request for access. In a preferred embodiment of the present invention, the receiver subsystem is arranged to encrypt the request for access based on the private key of the public-private key pair.

Respective further aspects of the invention provide a receiver subsystem, a content provider subsystem, and a clearing house subsystem of apparatus as herein before described.

In a preferred embodiment of the present invention, there is provided a conditional access broadcast system in which the subscriber is integrated into the protection chain. The system is operable in both business to business applications and in business to consumer applications. The system can operate without a back channel, but it can also operate with a back channel, if available, to provide enhanced convenience in operation. Advantageously, the system requires no special hardware in the receiver, but again, if, for example, a smart card reader or the like is provided in the receiver, the system may employ it in the interests again of enhancing convenience of operation.

An advantage associated with an embodiment of the present invention to be described shortly is that it permits a content provider to operate independently of third party network providers such as DAB or GSM network providers. Another advantage associated with the present invention is that it can use but does not require a back channel. A further advantage associated with the present invention is that it can be implemented in software alone, but can utilize external cryptoprocessors. Yet another advantage associated with the present invention is that it integrates users into the protection chain.

Preferred embodiments of the present invention will now be described, by way of example only, with reference to the accompanying drawings, in which.

Figure 1:
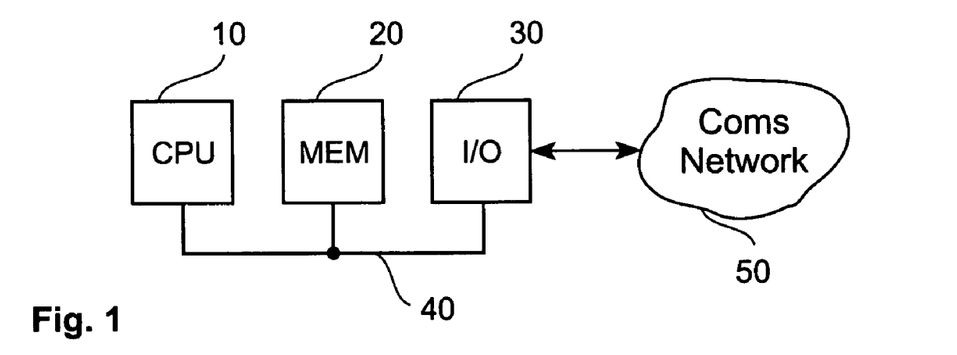
FIG. 1 is a block diagram of a data processing system.

Referring first to FIG. 1, an example of data processing system comprising a central processing unit (CPU) 10, a memory subsystem 20, and an input/output (I/O) subsystem 30, all interconnected by a bus subsystem 40. The I/O subsystem 30 is also connected to a communications network 50. The communications network 50 may comprise one or more of a range a public and private communications networks such as wired, wireless, and optical networks. In operation, the CPU 10 fetches, via the bus subsystem 40, data items and computer program code from the memory subsystem 20 and/or the I/O subsystem 30. The computer program may comprise operating system code, application program code, or a combination thereof. The CPU 10 executes instructions contained in the fetched program code to manipulate the associated data items and/or to output the data items via the I/O subsystem 30. The I/O subsystem comprises a network interface adapter, such as a wired or wireless modem, local area network adapter, or similar interface, for connecting the bus subsystem 40 to the network 50. The I/O subsystem 30 may additionally comprise one or more of a range of input devices including keyboard, mouse, tracker ball, joy stick, and the like. Similarly, the I/O subsystem 30 may include one or more of a range of output devices including display screen, printer, loudspeakers, and the like. The memory subsystem 20 comprises read only memory and random access memory connected to the bus subsystem 40. The memory subsystem 20 may additionally comprises one or more mass storage devices such as magnetic disk drives, optical disk drives, removable solid state memory, or the like. The data processing system herein before described with reference to FIG. 1 may be implemented as single unit such as a tower or desk top unit. However, in other embodiments of the present invention, the data processing system may distributed, with the CPU 10, memory subsystem 20, and I/O subsystem being distributed between multiple interconnected units. The CPU 10 may be constituted by a single processor module or by a plurality of processor modules. CPU 10 may be implemented by a single module or a plurality of modules. In the latter case, such modules may be distributed amongst multiple units. Similarly, elements of the memory subsystem 20 may distributed amongst multiple units.

Figure 2:
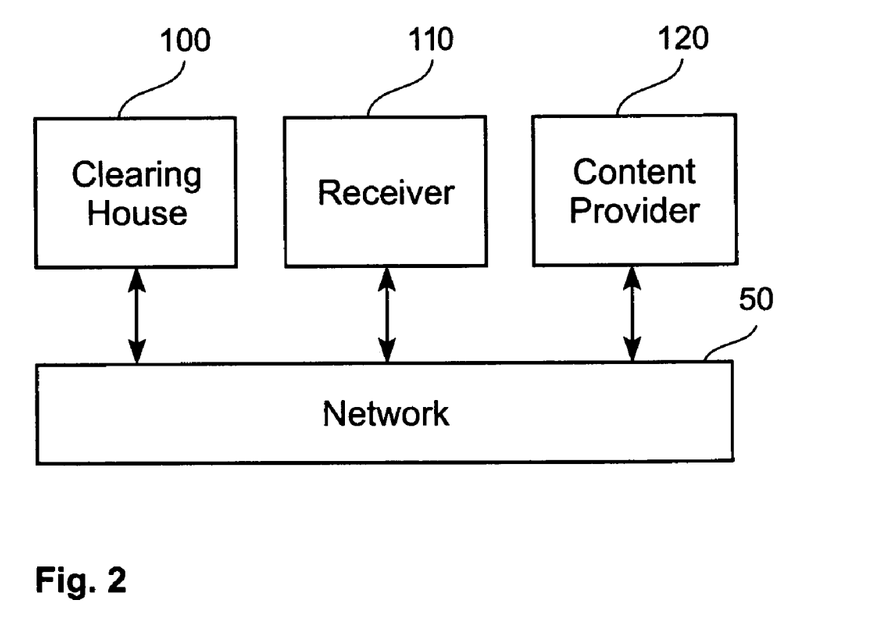
FIG. 2 is a block diagram of a conditional access broadcast system embodying the present invention.

Referring to FIG. 2, a preferred example of a conditional access broadcast system embodying the present invention comprises a clearing house subsystem 100, a content provider subsystem 120, and a receiver subsystem 110 all interconnected for communications via the network 50. Each of the clearing house subsystem 100, content provider subsystem 120, and receiver subsystem 110 comprises a data processing system such as that herein before described with reference to FIG. 1 connected to the network 50. In the interests of simplicity of explanation, a single receiver subsystem 110 is shown. However, in preferred embodiments of the present invention, there are a plurality of receiver subsystems 110 connected to the network 50. In particularly preferred embodiments of the present invention, there may be a plurality of clearing house subsystems 100 and a plurality of content provider subsystems 120 connected to the network 50 for interaction with receiver subsystems 110.

The content provider subsystem 120 stores in its memory a plurality of content items for broadcast. In operation, the content provider subsystem 120 is programmed by computer program code to encrypt each content item to be broadcast based on a corresponding combination of a stream or block cipher and randomly content key. In addition, the content provider subsystem 120 is configured by computer program code to generate a random blocking nonce for each content key generated. In particularly preferred embodiments of the present invention, the content keys and the blocking nonces each comprise a sequence of random bits. The content keys and the associated blocking nonces are then made available to the clearing house subsystem 100 by the content provider subsystem 120 via the network 50.

The clearing house subsystem 100 is programmed by computer program code to process subscriber orders for specific content items. Each receiver subsystem 110 comprises a public private key pair. A new subscriber wishing to acquire the keys for a particular content item registers the public key of the subscriber's receiver subsystem 110 with the clearing house subsystem 100, together with payment details such as credit card number or the like. Under program code control, the clearing house subsystem 100 creates in its memory subsystem a new subscriber record containing the public key of the subscriber's receiver subsystem 110 and the corresponding payment details of the subscriber. Once registered with the clearing house subsystem 100, the subscriber can generate electronic orders for broadcast content items signed with the private key of the subscriber's receiver subsystem 110 and transmits them to the clearing house subsystem 100 via the network 50. Upon checking, based on the payment details received, that the subscriber can pay for the requested access rights to the desired content items, the clearing house subsystem 100, under program code control, encrypts the content key corresponding to each desired content item based on the public key of the subscriber's receiver subsystem 110. To prevent the subscriber from decrypting the content keys straight away, and thus to a avoid the potential for the decrypted content keys to be illicitly shared with the subscriber's peers, the clearing house subsystem 100 encrypted the content keys a second time with the corresponding blocking nonce originally supplied by the content provider subsystem 120 prior to transmission to the subscriber. The second encryption is performed based on either a stream or block cipher. The double encrypted content keys are then sent to the receiver subsystem 110.

In turn, the receiver subsystem 110 stores the received double encrypted content keys in its memory subsystem. At the time of broadcast of the requested content items, the content provider subsystem 120 transmits the encrypted content items and the corresponding blocking nonces via the network 50 to the receiver subsystems 110 connected to the network 50. Once in receipt of the blocking nonces originally generated from the content provider subsystem 120, the subscriber's receiver subsystem 110, under program code control, employs its private key to decrypt the encrypted content keys. The receiver subsystem 110 then employs, under program code control, the decrypted content keys to decrypt the desired content items received from the content provider subsystem 120.

The I/O subsystems of some of the receiver subsystems 110 may comprise a connection to the Internet thereby facilitating both convenient registration of the public key of the receiver subsystem 110 with the clearing house subsystem 100 and, subsequently, convenient generation and transmission of signed orders for content access. Equally however, the I/O subsystems of the others of the receiver subsystems 110 may not provide Internet connectivity. For such receiver subsystems 110, there are a range of techniques for registering the public key with clearing house subsystem 100, for generating and transmitting signed orders for content keys, and for storing the double encrypted content keys supplied by the clearing house subsystem 100.

For example, in a preferred embodiment of the present invention, the I/O subsystem of such a receiver subsystem 110 comprises a smart card reader for connecting a smart card to the bus subsystem. A smart card is then employed for performing the public key cryptography operations. The smart card may provide both a cryptography token and content key storage. The content key purchasing procedure may then be carried out via an Internet connected personal computer belonging to the subscriber, via a kiosk system connected to the network 50, or via a mobile phone connected to the network and having a smart card reader. An advantage of this subsystem is that the same smart card may be employed in different receiver subsystems. Another advantage of this subsystem is that the private key may be created on and need never leave the smart card. A disadvantage associated with this subsystem is that it demands additional hardware components in the receiver subsystem 110.

The preferred embodiment described above is not limited to smart cards. Other mobile storage units can be used. When content receiver for example is a mobile one, such as is found in a car, transferring content could be done over the broadcast channel. Unfortunately, car stereos are not always active, or necessarily in range of any particular receiver, making reception difficult to ensure. If keys are delivered to the home of the subscriber, via home PC or some dedicated terminal connected to a telephone line, cable modem, or other data transfer medium, then the challenge lies in transferring those keys to the stereo in the car. As many car stereo systems are already equipped with removable units that owners take into their homes when they park the car overnight, access keys can preferably be loaded into these units via a cradle or short-range radio connection. In this way, the keys could be transferred to the car stereo without requiring any new behavior on the part of the owner. Thus, in another preferred embodiment, the recently introduced smart card solution is broadened to other mobile units, such as faceplates of car stereos, physical connectors or others.

In another embodiment of the present invention, the I/O subsystem of the receiver subsystem comprises a standard peripheral computing device interface such as a Universal Serial Bus (USB) interface for connection to another computing device in which there is provided an Internet connection. The computing device may for example be a personal computer or similar device. Content key purchasing program code is then loaded into the computing device for interacting with the receiver subsystem 110 via the computer device interface. The content key purchasing code may, for example, request the receiver subsystem 110 to sign orders and to produce the public key via the interface. Content keys are then obtained by the computing device on behalf of the receiver subsystem 110 and downloaded to the receiver subsystem via the interface.

In yet another embodiment of the present invention, both the public and private keys may be transmitted from the receiver subsystem 110 to an Internet-connected computing device belonging to the subscriber, such as a personal computer for example. Content key purchasing software loaded into the computing device then uses the keys to perform the content purchasing process. A disadvantage with this embodiment is that the private keys leave the receiver subsystem 110, thereby exposing them to the potential for attack or theft. An advantage associated with this embodiment is that the public and private keys can be distributed along with the content keys to multiple receiver subsystems 110.

However, instead of duplicating the internal private and public keys from the receiver subsystem to the computing device acting on behalf of the receiver subsystem, there may another private-public key pair be generated and allocated to the computing/downloading device. The public key of this key pair and the public key of the receiver subsystem are registered with the clearing house. Credit card information may be added. The clearing house then accepts orders for encapsulated content keys for the customer's receiver device if these orders are either signed by the receiver's subsystem public key or by the receiver's downloading device's public key. For the rest, the encapsulation process of the clearing house remains unchanged, that is that the clearing house uses only the public key of the receiver subsystem for encapsulating the content keys. In this preferred embodiment, also a set of downloading devices can be supported by allocating own private-public key pairs.

For receiver subsystems without a back channel that support an exchangeable storage medium, this storage medium can store the receiver subsystem's public key and a list of clearing house URLs extracted from signaling elements for the content that the user wants to subscribe to. The customer can have the receiver subsystem add clearing house URLs to the list of content that he tried to access but could not decrypt because of lack of appropriate encapsulated content keys but also for content that he knows he will want to display at some later time, in which case the appropriate URLs might be signaled in an electronic program guide. In order to purchase the content rights all he has to do is to remove the storage medium from the receiver subsystem, to insert it into the downloading device that is acting on behalf of the receiver subsystem, and—using the public key of the downloading device—to order the content keys by uploading the list of URLs together with the receiver subsystems public key to the clearing house. The clearing house will charge the customer's registered credit card, encapsulate the requested content keys using the public key of his receiver subsystem, and return the set of encapsulated content keys. The customer stores those on the storage medium, inserts it into his receiver subsystem and is ready to utilize the content protected content. The receiver subsystem preferably checks each newly inserted storage medium for new encapsulated content keys. If it finds any it will load those encapsulated content keys that are intended for its public key to its key management subsystem, e.g. by placing groups of encapsulated content keys into separate files bearing the respective receiver identifiers. Alternatively, the encapsulated content keys can be left on the storage medium in order to save receiver internal storage.

In another variation of this preferred embodiment, uniquely identifiable downloading devices—such as mobile phones are used—without allocating a second private-public key pair to such downloading device. As such downloading device can be uniquely identified with a customers, such downloading device can register with the clearing house for example by its phone number.

In addition, support can be provided for multiple receivers belonging to the same customer by adding the public keys of those additional receivers to the same customer record. When the customer uploads the list of URLs, he at the same time uploads the public key of the receiver he wants to use. The clearing house can then check that the uploaded public key is a known key and then use it for the encapsulation process.

Another variation allows the customer to not only obtain the set of encapsulated content for just one receiver but for a whole set of receivers. A selection list comprising all customer's registered receivers may then be included and the customer can then select additional receivers for which he wants to hat the set of encapsulated content keys as well. The downloaded set of encapsulated content keys is then stored on the storage medium which the customer can then use with any of his receivers.

Now, the registration process at the clearing house provides customer records that can comprise a multitude of public keys—at least one of the public keys is the designated receiver key. In case of multiple receivers being registered for one customer with the clearing house, there might be more receiver keys stored. The clearing house will accept orders signed by any of the registered public keys. Optionally, instead of the public key of a downloading device, a mobile phone number or any other identifier that uniquely identifies the customer can be used. The order process optionally allows the customer to request encapsulated content keys for more than one device. The clearing house will then generated the requested encapsulated content keys from each of the selected receivers and return all generated sets to the customer.

In a further embodiment of the present invention, the I/O subsystem of the receiver subsystem 110 comprises a wireless interface connection, such as a Bluetooth or IEEE 802.11 wireless interface, for connecting the receiver subsystem 110 to an external wireless device such as a mobile phone, personal digital assistant, or similar pervasive computing device. The external device performs the content access request process herein before described via a wireless connection to a relaying computer to obtain the content keys. The external device also interacts with the receiver subsystem 110 to obtain each blocking nonce and to return the corresponding decrypted content key.

It will be appreciated that other techniques are possible for integrating receiver subsystems 110 without Internet or similar back channel connectivity into conditional access systems embodying the present invention.

Figure 3:
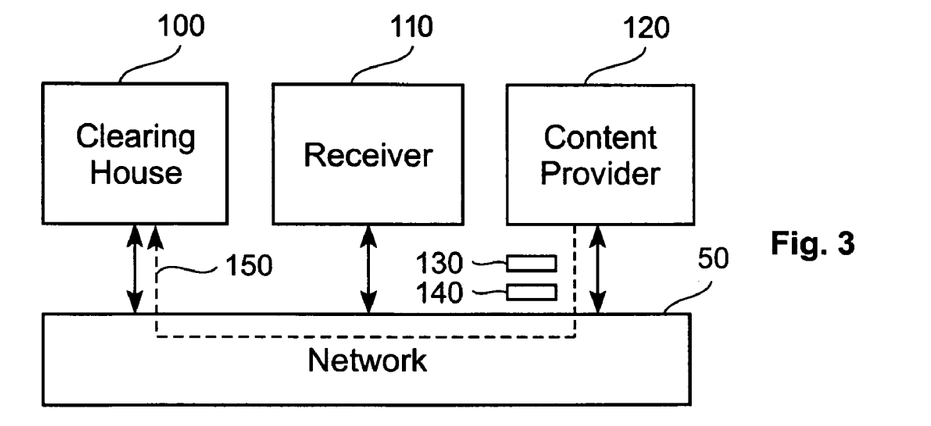
FIG. 3 is another block diagram of the conditional access broadcast system, now showing communications flow from a content provider subsystem to a clearing house subsystem.

With reference now to FIG. 3, in operation, a content item is initially encrypted by the content provider subsystem 120 using a stream or block cipher. In other embodiments of the present invention, the content provider subsystem 120 may encrypt each content item in real time as it is broadcast. The content provider subsystem 120 also randomly selects a blocking nonce 140 corresponding to the content item. A content key 130 corresponding to the cipher, together with the selected nonce 140, are then transferred to the clearing house subsystem 100 via the network 50, as shown by communication path 150. In some preferred embodiments of the present invention, subject to the encryption technology employed, an initialization vector or the like may also be supplied from the content provider subsystem 120 to the clearing house subsystem 100 via the network 50.

Figure 4:
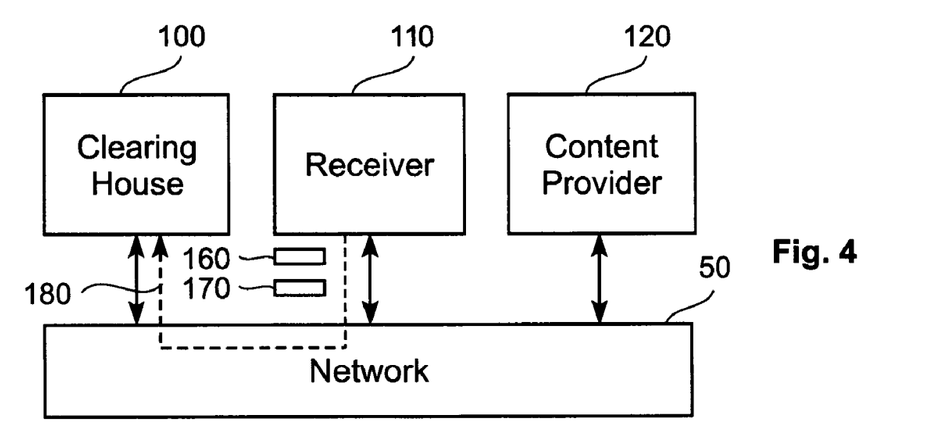
FIG. 4 is another block diagram of the conditional access broadcast system, now showing communications flow from a receiver subsystem to the clearing house subsystem.

Turning to FIG. 4, the receiver 110 comprises a public-private key pair consisting of a public key 160 and a private key (not shown). In operation, the subscriber possessing the receiver subsystem 110 initially transmits the public key 160 to the clearing house subsystem 100 via the network, along with an order 170 for access to the content item, as shown by communication path 180. On receipt of the key 160, the clearing house subsystem 100 registers the subscriber. In some embodiments of the present invention, the order 170 may involve a financial transaction such as a credit card transaction to facilitate subscriber access to content and services carrying an access charge. In particularly preferred embodiment of the present invention, enhanced security may be provided by the receiver subsystem 110 encrypting subsequent orders for content items with its private key for decoding upon receipt by the clearing house subsystem 100 in which the corresponding public key is registered.

Figure 5:
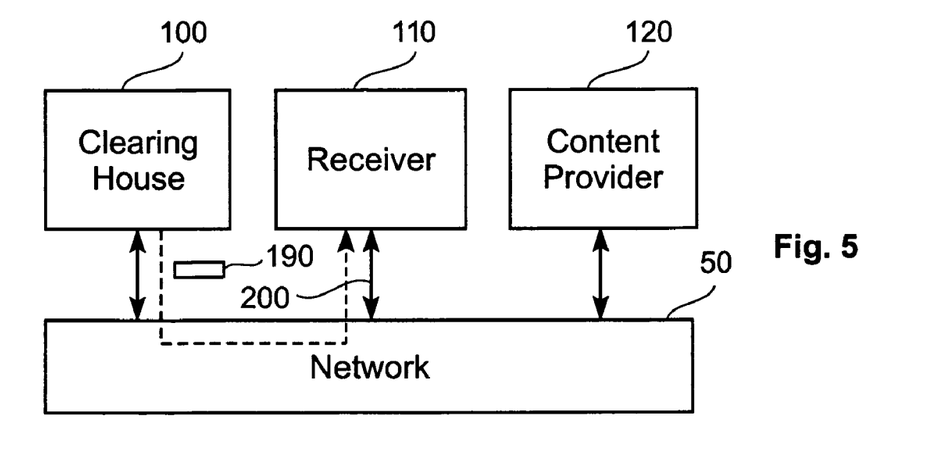
FIG. 5 is another block diagram of the conditional access broadcast system, now showing communications flow from the clearing house subsystem to the receiver subsystem.

Referring now to FIG. 5, the clearing house subsystem 100 encrypts the requested content key with the public key 160 of the receiver subsystem 110. The clearing house subsystem 100 then encrypts the public key encrypted content key with the blocking nonce 140 corresponding to the request content based on a stream or blocking cipher. Finally, the clearing house subsystem 100 transmits the double encrypted content key 190 to the receiver subsystem 110 via the network 50, as indicated by communication path 200. The receiver subsystem 110 cannot immediately decode the received double encrypted content key 190 because it does not have the blocking nonce 140.

Figure 6:
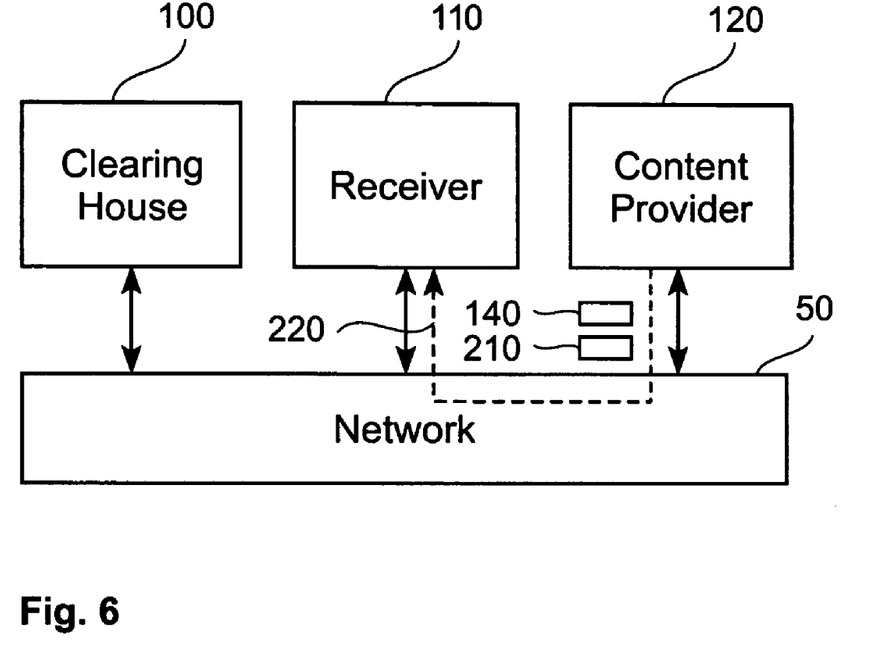
FIG. 6 is another block diagram of the conditional access broadcast system, now showing communications flow from the content provider subsystem to the receiver subsystem.
Figure 7:
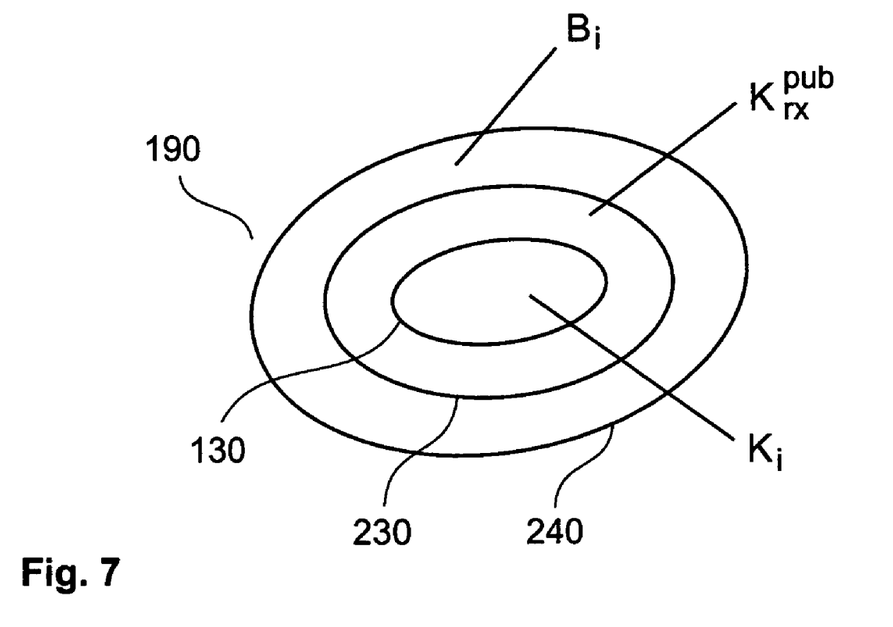
FIG. 7 is a block diagram of a double encrypted content key supplied from the content provider subsystem to the receiver subsystem.

Referring to FIG. 6, the content provider subsystem 120 eventually broadcasts the encrypted content item 210 along with the corresponding blocking nonce 140 on the network 50 for detection by the receiver subsystem 110. Upon detection, the receiver subsystem 110 decrypts the double encrypted content key 190 received from the clearing house subsystem 100 using the blocking nonce 140 received from the content provider subsystem 120 so that the encrypted content item received from the content provider subsystem 120 can be decoded. With reference now to FIG. 7, the double encrypted content key 190 as delivered to the receiver 110 can be regarded as the content key $K_i$ 130 protected by an inner encryption layer 230 generated by encrypting the content key $K_i$ 130 with the public key $K_{rx}^{pub}$ 160 of the receiver 10 and an outer encryption layer 240 generated by encrypting the public key encrypted content key with the blocking nonce $B_i$ 140.

Figure 8:
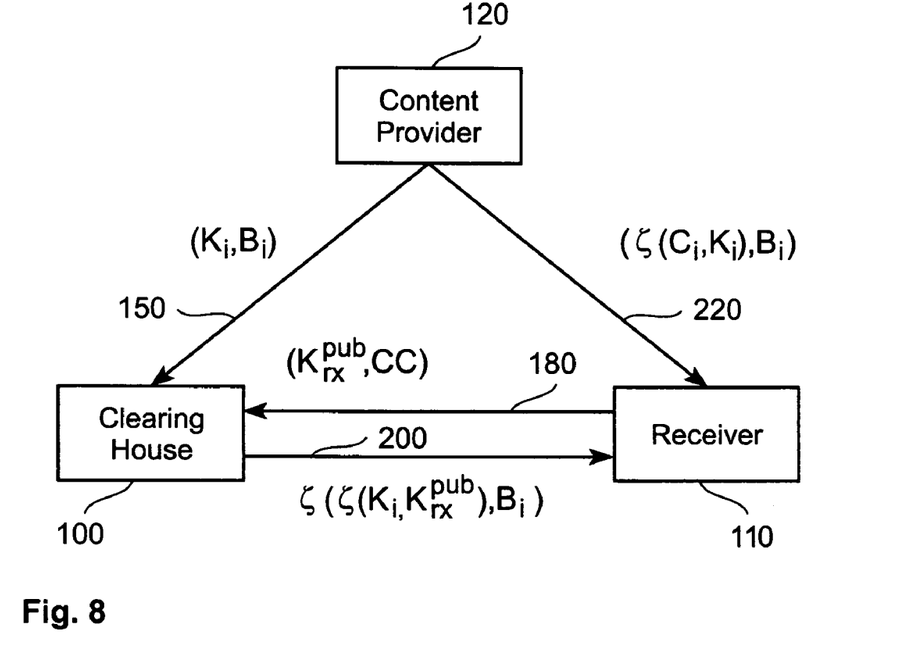
FIG. 8 is a flow diagram of communications between the content provider, clearing house, and receiver subsystems.

Referring now to FIG. 8, as herein before described, the content provider subsystem 120 sends the randomly selected content key $K_i$ 130 and the randomly selected blocking nonce $B_i$ 140 to the clearing house subsystem 100 via the network 50 along communication path 150. The clearing house subsystem 100 receives the public key $K_{rx}^{pub}$ 160 of the receiver subsystem 110 from the receiver subsystem 110 via the network along communication path 180, along with payment details CC such as credit card details from the subscriber. Based on the public key $K_{rx}^{pub}$ 160 of the receiver subsystem 110, the clearing house subsystem 100 encrypts the content key $K_i$ 130 to produce the public key encrypted content key $\epsilon(K_i, K_{rx}^{pub})$. Next, the clearing house subsystem 100 further encrypts the public key encrypted content key $\epsilon(K_i, K_{rx}^{pub})$ based on the blocking nonce $B_i$ 140 to produce the double encrypted content key $\epsilon(\epsilon(K_i, K_{rx}^{pub}), B_i)$ 190. The clearing house subsystem 100 then sends the double encrypted content key $\epsilon(\epsilon(K_i, K_{rx}^{pub}), B_i)$ 190 to the receiver subsystem 110 via the network 50 as indicated by communication path 200. In the embodiments of the present invention herein before described, the double encryption is indicated being provided by a pair of similar encryption operations $\epsilon(.,.)$. However, in other embodiments of the present invention, the double encryption may be performed by a two different encryption operations. It will also be appreciated that, in other embodiments of the present invention, the content key may be encased in more than two layers of encryption.

Figure 9:
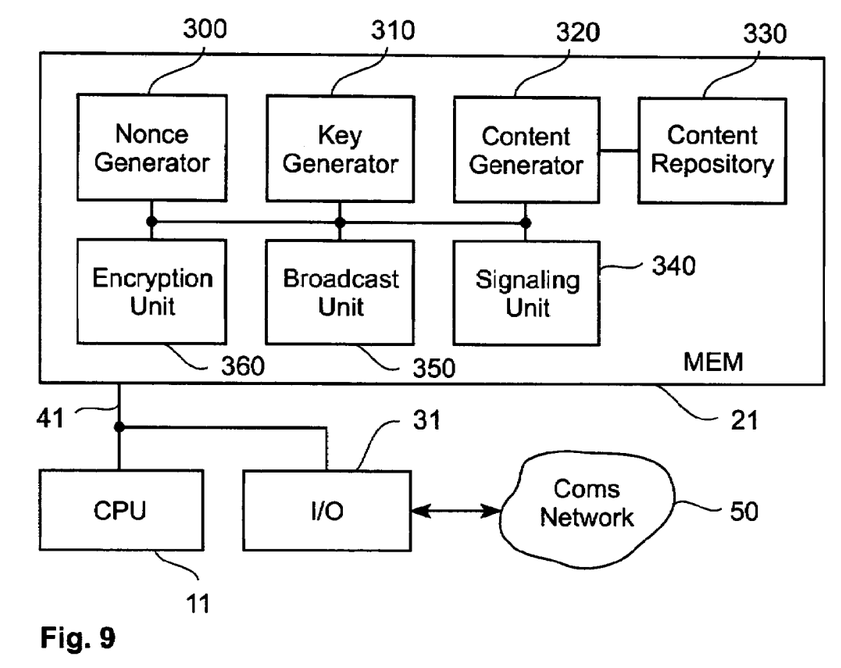
FIG. 9 is a block diagram of an example of a content provider subsystem for the conditional access system.

Referring now to FIG. 9, as indicated earlier, a preferred example of the content provider subsystem 120 comprises a data processing system having a CPU 11, and I/O subsystem 31, and memory subsystem 21, all interconnected by a bus subsystem 41. The memory subsystem 21 stored computer program code for controlling the CPU 11 to perform of the functions of a nonce generator 300, a key generator 310, a content generator 320, an encryption unit 360, a broadcast unit 350, and a signaling unit 340, all interconnected. The memory subsystem 21 also comprises a content repository 330 connected to the content generator 320. In operation, the content generator 320 generates content items and prepares preexisting content items stored in the content repository 330 for broadcast. The key generator 310 generates a random key $K_i$ for each content item $C_i$ to be broadcast. Similarly, the nonce generator 300 generates a random nonce $B_i$ for each content item $C_i$ to be broadcast. The encryption unit 360 encrypts each content item $C_i$ to be broadcast based on the corresponding key $K_i$ to produce an encrypted content item $\zeta_i$ according to:

$$\zeta_i = \epsilon(C_i, K_i) \tag{1}$$

Where $\epsilon(.,.)$ is the encryption operation executed by the encryption unit 360. The signaling unit 340 controls the I/O subsystem 31 via the CPU 11 to communicate the content keys corresponding to the content items, together with the corresponding nonces, to the clearing house subsystem 100.

As indicated earlier, the encryption algorithm may employ stream or block ciphers. It will be appreciated that other embodiments of the present invention may use different ciphers. In the event that block ciphers are employed additional padding may be introduced, subject to the size of the blocks of data constituting the content items and the block size accepted by the encryption algorithm. The signaling unit 340 interoperates with the encryption unit 360 and the broadcast unit 350 to generate signaling elements for conveying control data such as identity of content, serial number of key, level of padding, and the blocking nonce $B_i$ to the receiver subsystem 110. The broadcast unit 350 controls the I/O subsystem 31 via the CPU 11 to broadcast the encrypted content item $\zeta_i$ together with the corresponding nonce $B_i$ and other signaling element via the network 50.

The content items in the context of the present invention can include one or more of a range of data items that can be divided into blocks, including data files, data objects, applets, audio files, video files, streaming data, stream audio, streaming video, Internet Protocol (IP) packets, and the like.

Figure 10:
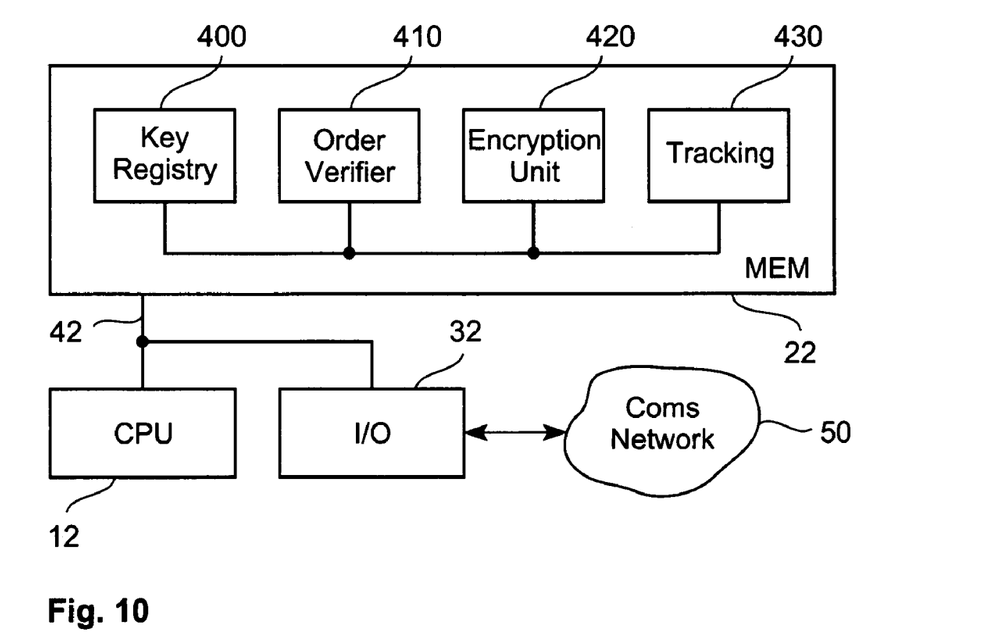
FIG. 10 is a block diagram of an example of a clearing house subsystem for the conditional access system.

Referring now to FIG. 10, a preferred example of the clearing house subsystem 100 comprises a data processing system having a CPU 12, and I/O subsystem 32, and memory subsystem 22, all interconnected by a bus subsystem 42. The memory subsystem 22 stores computer program code for controlling the CPU 12 to perform the functions of a key registry 400, an order verifier 410, an encryption unit 420, and a tracking unit 430, all interconnected. In operation, the key registry 400 registers public keys and payment details belonging to subscriber. The order verifier 410 accepts and verifies content key orders received from subscribers and performs a payment process based on such orders. The encryption unit 420 encrypts a requested content key $K_i$ with the public key $K_R^{pub}$ of the requesting subscriber and encrypts the encrypted content keys with the corresponding blocking nonce $B_i$, according to the double encryption algorithm:

$$\psi_{i\text{-}rx}=\epsilon(\epsilon(K_i, K_R^{pub}), B_i) \quad (2)$$

Where $\psi_{i\text{-}rx}$ is the double encrypted content key sent to the subscriber's receiver subsystem 110, and $\epsilon(.,.)$ is the encryption algorithm. A indicated earlier, the double encrypted content key is then delivered to the receiver subsystem 110. The tracking unit 430 keeps track of which keys have been paid for and received by each subscriber. Referring to equation 2 above, in preferred embodiments of the present invention, an order for a content key $K_i$ is cryptographicly signed using a public-private key cryptography algorithm. To encrypt requested content keys in preferred embodiments of the present invention, the registered public key $K_R^{pub}$ of the requester's receiver subsystem 110 is used. Thus only the receiver subsystem, being in possession of the matching private key, can decrypt the content key. To double decrypt the public key encrypted content key, any one of a range of stream or block ciphers may be employed, together with the blocking nonce $B_i$ corresponding to the content key $K_i$, may be employed. For block ciphers, it is desirable in the interests of data processing for the encrypted content key to be of a size divisible by the block size of the block cipher. Otherwise, padding may be added and signaled as herein before described.

Figure 11:
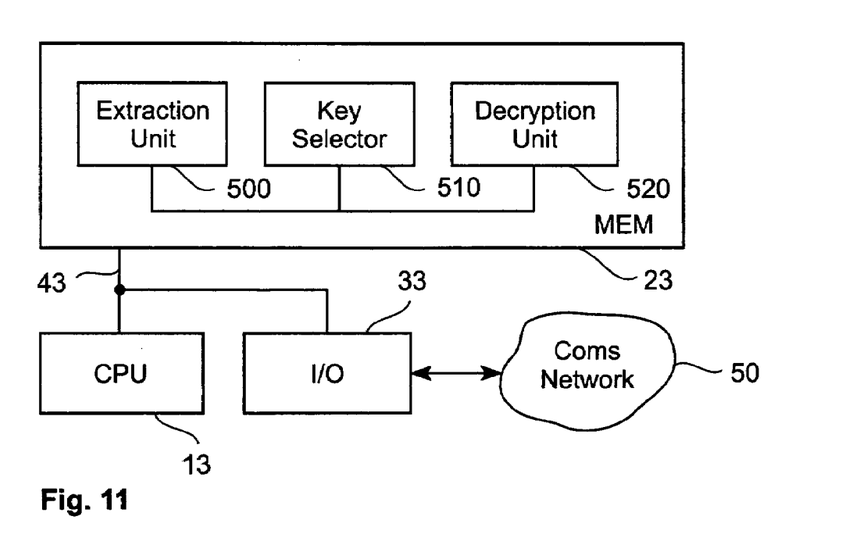
FIG. 11 is a block diagram of an example of a receiver subsystem for the conditional access system.

Referring now to FIG. 11, a preferred example of the receiver subsystem 110 comprises a data processing system having a CPU 13, and I/O subsystem 33, and memory subsystem 23, all interconnected by a bus subsystem 43. The memory subsystem 23 stores computer program code for controlling the CPU 13 to perform the functions of an extraction unit 500, a key selector 510, and a description unit 520, all interconnected. In operation, as herein before described, the receiver subsystem acquires, via the network 50, a double encrypted content key $\psi_{i\text{-}rx}$ from the clearing house subsystem 100 for each content item to be received. Similarly, as herein before described, the receiver subsystem 110 receives, via the network 50, the corresponding encrypted content items $\zeta_i$ and the associated signaling elements from the content provider subsystem 120. The extraction unit 500, extracts the content ID, blocking nonce $B_i$, and key serial number from the signaling elements received. The key selector 520 then selects, based on the content ID and serial number data recovered by the extraction unit 500, the appropriate double encrypted content key for each content item to be received. The memory subsystem 23 also stores the public-private key pair of the receiver subsystem 110. In preferred embodiments of the present invention, the public-private key pair may be stored in the key selector 510. The description unit 520, for each content item to be received, decrypts the double encrypted content key based on the blocking nonce $B_i$ received from the content provider subsystem 120 to recover the public key encrypted content key and then decrypts the public key encrypted content key based on the private key $K_R^{priv}$ of the receiver subsystem 110 according to:

$$K_i=D(D(\psi_{i\text{-}rx}, B_i), K_R^{priv}) \quad (3)$$

Where $D(.,.)$ is the double decryption algorithm. The description unit 520 then decrypts the corresponding encrypted content item received form the content provider subsystem 120 based on the recovered content key $K_i$ according to:

$$C_i=D(\zeta_i, K_i) \quad (4)$$

Note that the ciphers employed in the content provider subsystem 120 and the clearing house subsystem 100 determine the ciphers employed in the receiver subsystem 110.

It will be appreciated that many implementations of the present invention are possible. For example, it will be recognized that different embodiments of the present invention may involve various different encryption algorithms. Similarly, it will be appreciated that the different embodiments of the present invention may operate via different distribution network technologies. Likewise, as herein before described, there are various ways in which the content keys may be supplied to the receiver subsystem 110.

An especially preferred embodiment of the present invention is compatible with the Eureka-147 Digital Audio Broadcast distribution network, and, in particular, the Multimedia File Transfer (MOT) over the DAB network. In this DAB compatible embodiment of the present invention, a mobile Internet connection, such as a General Packetized Radio System (GPRS) phone, is employed for acquiring and storing content keys, and an Advanced Encryption Standard (AES) block cipher in Cipher Block Chaining (CBC) and Electronic Code Book (ECB) mode is used for the encryption process. Although the DAB embodiment will be described herein with reference to file transfers, it is equally applicable to transfer of other data forms or objects, such as DAB audio, video, and IP streaming.

For multimedia file transfer over DAB utilizing the DAB MOT protocol, files are segmented into MOT data groups. Each sequence of MOT data groups comprises an MOT data group header object followed by a plurality of MOT data group body objects containing the file to be transferred. The MOT data group header object contains attributes describing the transmitted file, together with auxiliary, application specific attributes such as path names, file types, and the like. By examining the header object, a DAB receiver subsystem 110 can reassemble the transmitted file, and, if the file is part of a set of files to assembled into a directory hierarchy, place it in the right site in the hierarchy.

To enable the DAB receiver subsystem 110 to decrypt an encrypted file, signaling elements are included in the transmitted data stream to specify the conditional access system used, the cryptographic algorithms employed, and an address to label the content or a group of receiver subsystems 110. These signaling elements are specified in DAB in the form of Entitlement Checking Messages (ECMs). Each ECM comprises a customer addressing field. The ECM addressing field is employed in this embodiment of the present invention to specify which set key from the set and to transmit the blocking nonce.

Figure 12:
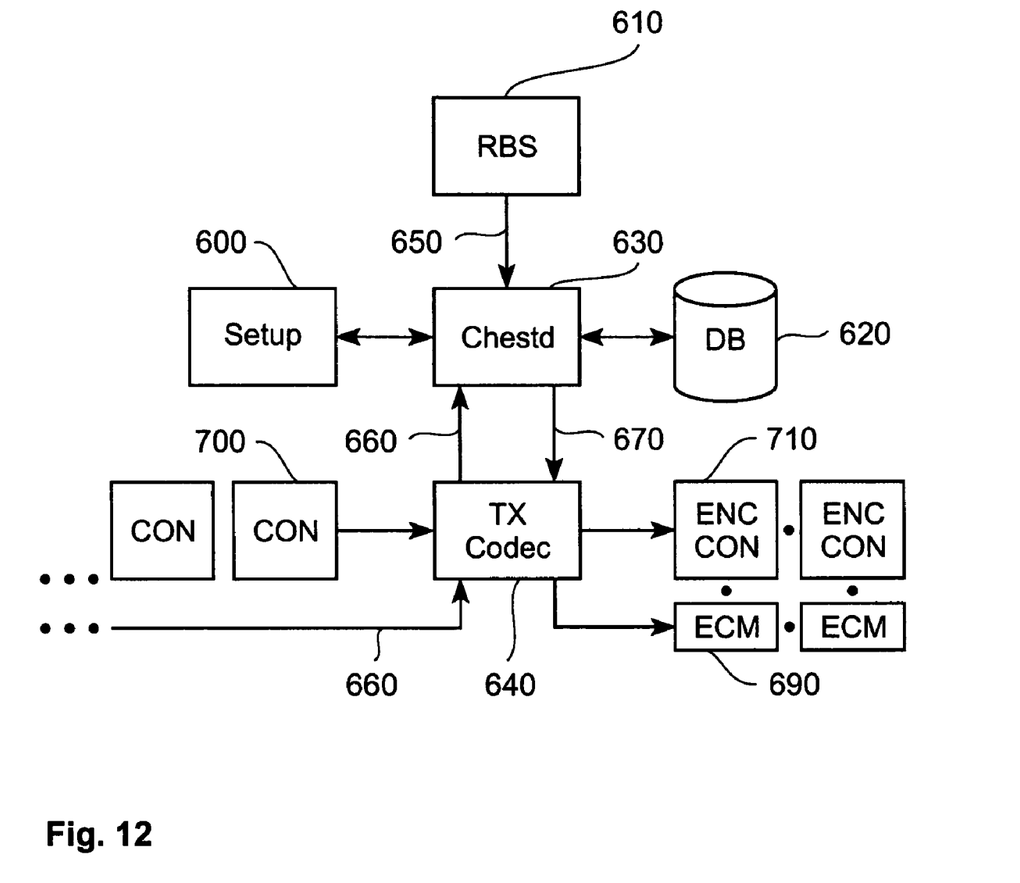
FIG. 12 is a block diagram of a preferred example of a content provider subsystem for a DAB conditional access broadcast system embodying the present invention; and, FIG. 13 is a block diagram of a preferred example of a receiver subsystem for a DAB conditional access broadcast system embodying the present invention.

Referring now to FIG. 12, an example of a content provider subsystem 120 for the aforementioned DAB compatible embodiment of the present invention comprises a setup console 600 connected to a key management unit (CHESTD) 610. The key management unit 610 is also connected to a key database (DB) 620, a random bit sequence generator (RBS GEN) 630 and a transmission codec (TX CODEC) 640. In operation, the setup console 600, which may implemented by a personal computer or the like, permits operatives of the content provider subsystem 120 to set up parameters of the content provision service such as content ID and pricing. For content encryption, the AES algorithm is utilized in CBC mode with a key, initialization vector, and block size of 128 bits. The random bit sequence generator 630 generates the key, initialization vector, and blocking nonce as random bit sequences 650. The AES key and initialization vector are concatenated by the key management unit to produce a 256 bit content key.

It will be appreciated that in other embodiments of the present invention, the content key may be longer or shorter than 256 bits. The key management unit 630 produces a sufficiently large number of content keys and associated blocking nonces for each content set to be broadcast. The keys and nonces thus generated are stored in the database 620 together with the associated content IDs for later use. The transmission codec 640 receives input content items 700 and the accompanying content IDs 660. Each content ID 660 is sent by the transmission codec 640 to the key management unit 630 to fetch the corresponding content key 670 and blocking nonce from the database 620. Each content item 700 is then AES encrypted by the TX codec 640 using AES in CBC mode to produce an encrypted content item 710. The TX codec 640 also generates an ECM 690 corresponding to the content item 660. The ECM 690 contains the content ID 660, the serial number of the content key 670 used and the blocking nonce. If a complete file is encoded, then the TX codec 640 generates an ECM template that can be used by subsequent stages of the transmission process.

An example of a clearing house subsystem 100 for the aforementioned DAB compatible embodiment of the present invention comprises a similar database to database 620 of the content provider subsystem 120 herein before described with reference to FIG. 12. When an order for a content item subsystem 110 is received from the receiver subsystem 10 via the aforementioned mobile Internet connection, the clearing house subsystem 100 stores the public key of the receiver subsystem 100 in the database, checks the signature of the order, charge the billing account for the access fee, and then retrieve the requested contents key and corresponding blocking nonce. As herein before described, the content key, comprising the aforementioned 256 bit concatenation of the AES key and the AES initialization vector, are public key encrypted by the clearing subsystem 100 using the public key of the receiver subsystem 110. The public key encrypted content key is then encrypted by the clearing house subsystem 110 using AES encryption in ECB mode with the blocking nonce as the AES key. The double encrypted content key is then transmitted to the receiver subsystem 110.

Figure 13:
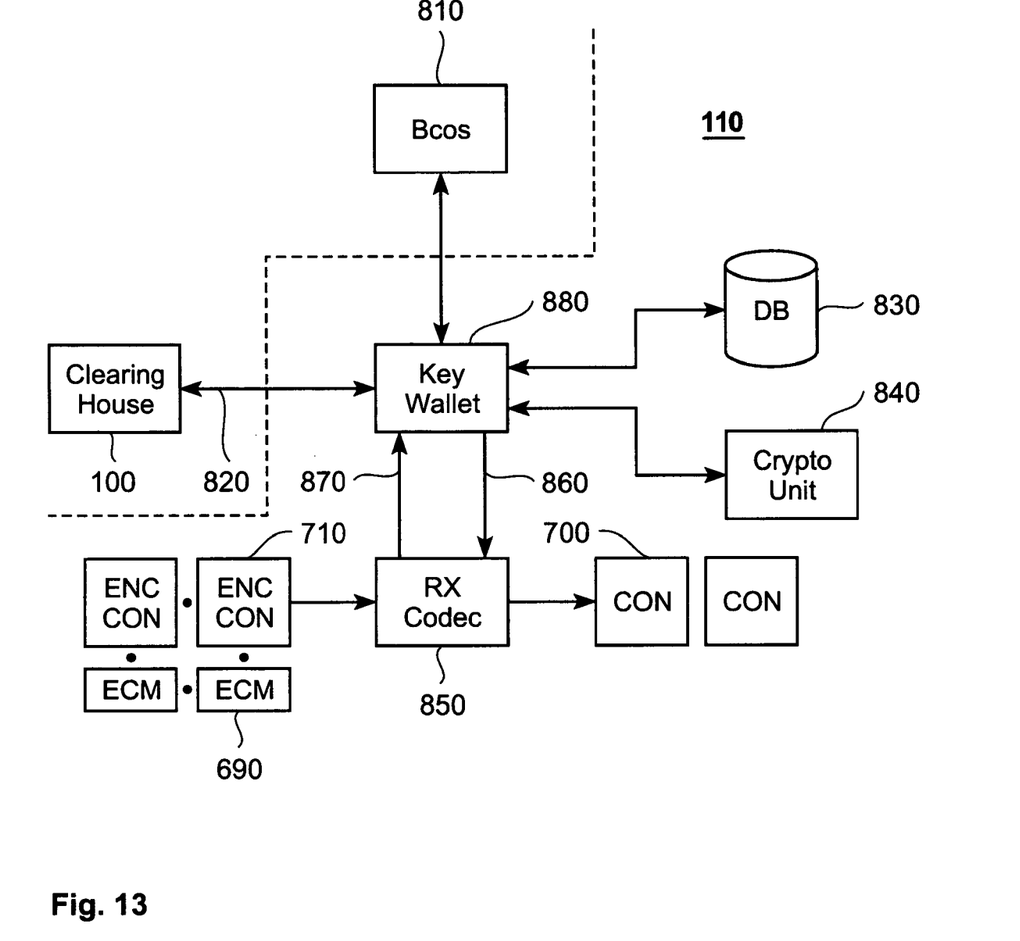

Referring now to FIG. 13, an example of a a receiver subsystem 110 for the aforementioned DAB compatible embodiment of the present invention comprises a key wallet 880 connected to a cryptographic unit 840, an RX codec 850, and a database 830. In operation, the key wallet generates a signed content key order in cooperation with the cryptographic unit 840, contacts the clearing house subsystem 100 via the aforementioned mobile Internet connection 820, acquires the double encrypted content key from the clearing house subsystem 100, and stores the double encrypted content key in the database 830. On receipt of the content item 700 for which the double encrypted content key was acquired, the RX codec 850 reads the associated ECM 690 to obtain the content ID, the blocking nonce, and the serial number of the key. The content ID 870 and key serial number is sent to the key wallet 880 by the RX codec 850. In turn, the key wallet 880 retrieves the set of keys corresponding to the content D from the database 830 and selects the double encrypted content key corresponding to the serial number from the retrieved set. The selected double encrypted key 860 is then sent from the key wallet 880 to the RX codec 850. The RX codec 850 decrypts the double encrypted key 860 using AES in ECB mode with the blocking nonce as the AES key corresponding to the content item 710 to recover the public key encrypted content key and then decrypts the public key encrypted content key using the private key of the receiver subsystem 110. The RX codec 850, then uses the decrypted content key to decode the encrypted content item 710 to recover the requested content item 700.

In a business to business application of this embodiment of the present invention, where the number of subscribers can be expected to be limited, the double encrypted content keys may distributed via a broadcast web site 810 as directories of files with each file containing the content key for a particular receiver subsystem 110. This advantageously avoids employing a back channel or the like for installing content keys in the receiver subsystems 110.

In a modification to the embodiments of the present invention herein before described, the AES initialization vector is separated from the AES key. Specifically, different initialization vectors are sent as part of the ECM. This advantageously permits the reuse of content keys without comprising security. Additionally, receiver subsystems 110 may conveniently join broadcasts in progress. For DAB audio streams, this variation can be simplified further by using a DAB audio frame counter as initialization vector, thereby reducing bandwidth requirements further.

Embodiments of the present invention have been herein before described with reference to computer program code executing on CPUs of data processing systems. It will be appreciated however, that the present invention may be equally implemented by hardwired electronic circuitry alone or by a combination of computer program code executing on a CPU and hardwired circuitry.

The invention claimed is:

1. A method for providing a receiver subsystem with access via a clearing house subsystem to a broadcast content item broadcast from a content provider subsystem, the method comprising:

in the content provider subsystem, encrypting the broadcast content item based on a content key to produce an encrypted content item, generating a blocking nonce corresponding to the content key, transmitting the content key and the blocking nonce to the clearing house subsystem, and transmitting the encrypted content item and the blocking nonce to the receiver subsystem;

in the clearing house subsystem, receiving the content key and the blocking nonce from the content provider subsystem, receiving a public key of a public-private key pair of the receiver subsystem, and, in response to a request for access to the broadcast content item, encrypting the content key based on the public key to produce a public key encrypted content key, encrypting the public key encrypted content key based on the blocking nonce to produce a double encrypted content key, and transmitting the double encrypted content key to the receiver subsystem; and, in the receiver subsystem, receiving the double encrypted content key from the clearing house subsystem, receiving the encrypted content item and the blocking nonce from the content provider subsystem, decrypting the double encrypted content key based on the blocking nonce to recover the public key encrypted content key, decrypting the public key encrypted content key based on a private key of the public-private key pair to recover the content key, and decrypting the encrypted content item based on the content key to recover the requested broadcast content item.

2. A method as claimed in claim 1, further comprising generating the request for access in the receiver subsystem.

3. A method as claimed in claim 2, further comprising in the receiver subsystem, encrypting the request for access based on the private key of the public-private key pair.

4. A method as claimed in claim 1, wherein the method is employed in a business to business application.

5. A method as claimed in claim 1, wherein the step of transmitting comprises distributing the double encrypted content keys via a broadcast web site as directories of files, each file containing the content key for a particular receiver subsystem.

6. A method as claimed in claim 1, wherein at least one step involves a financial transaction to facilitate subscriber access to content and/or services carrying an access charge.

7. A method as claimed in claim 1, further comprising providing enhanced security by the receiver subsystem encrypting subsequent requests for content items with the private key for decoding upon receipt by the clearing house subsystem in which a corresponding public key is registered.

8. A method as claimed in claim 1, wherein the one or more steps of claim 1 are provided as part of a conditional access broadcast system in which a subscriber is integrated into a protection chain.

9. A method as claimed in claim 1, further including operating with a back channel.

10. A method as claimed in claim 1, further including employing a smart card reader in the receiver.

11. A method as claimed in claim 1, further including enabling the content provider to operate independently of any third party network providers.

12. A program storage device readable by machine, tangibly embodying a program of instructions executable by the machine to perform method steps for providing the broadcast content item, said method steps comprising the steps of claim 1.

13. Apparatus for providing access to a broadcast content item, the apparatus comprising:
a receiver subsystem having a public private key pair;
a content provider subsystem having an first encryption unit for encrypting the broadcast content item based on a content key to produce an encrypted content item, a nonce generator for, generating a blocking nonce corresponding to the content key, and a first transmitter connected to the encryption unit and nonce generator for transmitting the content key, the blocking nonce— and the encrypted content item; and,
a clearing house subsystem having a first receiver for receiving the content key and the blocking nonce from the content provider subsystem and the public key of the receiver subsystem, a second encryption unit connected to the first receiver for encrypting the content key based on the public key to produce a public key encrypted content key and encrypting the public key encrypted content key based on the blocking nonce to produce a double encrypted content key in response to a request for access to the broadcast content item, and a second transmitter connected to the second encryption unit for transmitting the double encrypted content key to the receiver subsystem;
wherein, the receiver subsystem further comprises a second receiver for receiving the double encrypted content key from the clearing house subsystem and the encrypted content item and the blocking nonce from the content provider subsystem, and a decryption unit connected to the receiver for decrypting the double encrypted content key based on the blocking nonce to recover the public key encrypted content key, decrypting the public key encrypted content key based on a private key of the public private key pair to recover the content key, and decrypting the encrypted content item based on the content key to recover the requested broadcast content item.

14. Apparatus as claimed in claim 13, wherein the receiver subsystem is arranged to generate the request for access.

15. A method as claimed in claim 14, wherein the receiver subsystem is arranged to encrypt the request for access based on the private key of the public-private key pair.

16. A receiver subsystem of apparatus as claimed in claim 13.

17. A content provider subsystem of apparatus as claimed in claim 13.

18. A clearing house subsystem of apparatus as claimed in claim 13.

19. A Digital Audio Broadcast system comprising apparatus as claimed in claim 13.

20. An article of manufacture comprising a computer usable medium having computer readable program code means embodied therein for causing provision of a receiver subsystem with access via a clearing house subsystem to the broadcast content item broadcast from a content provider subsystem, the computer readable program code means in said article of manufacture comprising computer readable program code means for causing a computer to effect:
in the content provider subsystem, encrypting the broadcast content item based on a content key to produce an encrypted content item, generating a blocking nonce corresponding to the content key, transmitting the content key and the blocking nonce to the clearing house subsystem, and transmitting the encrypted content item and the blocking nonce to the receiver subsystem;
in the clearing house subsystem, receiving the content key and the blocking nonce from the content provider subsystem, receiving a public key of a public-private key pair of the receiver subsystem, and, in response to a request for access to the broadcast content item, encrypting the content key based on the public key to produce a public key encrypted content key, encrypting the public key encrypted content key based on the blocking nonce to produce a double encrypted content key, and transmitting the double encrypted content key to the receiver subsystem; and,
in the receiver subsystem, receiving the double encrypted content key from the clearing house subsystem, receiving the encrypted content item and the blocking nonce from the content provider subsystem, decrypting the double encrypted content key based on the blocking nonce to recover the public key encrypted content key, decrypting the public key encrypted content key based on a private key of the public-private key pair to recover the content key, and decrypting the encrypted content item based on the content key to recover the requested broadcast content item.

21. A computer program product comprising a computer usable medium having computer readable program code means embodied therein for causing provision of a broadcast content item, the computer readable program code means in said computer program product comprising computer readable program code means for causing a computer to effect:
a receiver subsystem having a public private key pair;
a content provider subsystem having an first encryption unit for encrypting the broadcast content item based on a content key to produce an encrypted content item, a nonce generator for generating a blocking nonce corresponding to the content key, and a first transmitter connected to the encryption unit and nonce generator for transmitting the content key, the blocking nonce and the encrypted content item; and, a clearing house subsystem having a first receiver for receiving the content key and the blocking nonce from the content provider subsystem and the public key of the receiver subsystem, a second encryption unit connected to the first receiver for encrypting the content key based on the public key to produce a public key encrypted content key and encrypting the public key encrypted content key based on the blocking nonce to produce a double encrypted content key in response to a request for access to the broadcast content item, and a second transmitter connected to the second encryption unit for transmitting the double encrypted content key to the receiver subsystem;

wherein, the receiver subsystem further comprises a second receiver for receiving the double encrypted content key from the clearing house subsystem and the encrypted content item and the blocking nonce from the content provider subsystem, and a decryption unit connected to the receiver for decrypting the double encrypted content key based on the blocking nonce to recover the public key encrypted content key, decrypting the public key encrypted content key based on a private key of the public private key pair to recover the content key, and decrypting the encrypted content item based on the content key to recover the requested broadcast content item.

* * * * *